(12) United States Patent
Reeves et al.

(10) Patent No.: US 7,855,640 B2
(45) Date of Patent: Dec. 21, 2010

(54) METHOD AND SYSTEM OF DETERMINING ALARM CONDITIONS

(75) Inventors: Bryan Reeves, Brisbane (AU); David Noon, Brisbane (AU)

(73) Assignee: Groundprobe Pty Ltd, Queensland (AU)

( * ) Notice: Subject to any disclaimer, the term of this patent is extended or adjusted under 35 U.S.C. 154(b) by 367 days.

(21) Appl. No.: 11/988,820

(22) PCT Filed: Jul. 21, 2006

(86) PCT No.: PCT/AU2006/001036

§ 371 (c)(1),
(2), (4) Date: Jan. 15, 2008

(87) PCT Pub. No.: WO2007/012112

PCT Pub. Date: Feb. 1, 2007

(65) Prior Publication Data

US 2009/0121888 A1    May 14, 2009

(30) Foreign Application Priority Data

Jul. 25, 2005   (AU) ............................... 2005903927

(51) Int. Cl.
   *G08B 21/00*   (2006.01)
(52) U.S. Cl. .................... 340/540; 340/539.26; 340/690
(58) Field of Classification Search ................ 340/540, 340/669, 539.26, 539.29, 601, 633, 690; 702/189
See application file for complete search history.

(56) References Cited

U.S. PATENT DOCUMENTS 5,216,922 A * 6/1993 Gustafson et al. ............. 73/784

FOREIGN PATENT DOCUMENTS

| JP | 2003214849 A * | 7/2003 |
| WO | 02/46790 A1 | 6/2002 |
| WO | 03/014763 A1 | 2/2003 |

OTHER PUBLICATIONS

McHugh et al., Evaluating Techniques for Monitoring Rock Falls and Slope Stability; 21st International Conference on Ground Control in Mining, pp. 335-343, Aug. 2002; <retrieved at http://www.cdc.gov/niosh/mining/pubs/pdfs/etfmr.pdf on Aug. 23, 2006> See for example sections—"Interfometric Radar", "Photographic Image Analysis", "Photographic Change Detection" and "Real-Time Monitoring".

(Continued)

*Primary Examiner*—Toan N Pham
(74) *Attorney, Agent, or Firm*—Howard & Howard Attorneys PLLC

(57) ABSTRACT

A method and system for determining alarm conditions of a slope under inspection whereby one or more dimensionless threat estimate values are calculated for one or more time periods. The maximum dimensionless threat estimate value calculated is selected and compared with a threshold alarm value. If the maximum dimensionless threat estimate value exceeds the threshold alarm value alarm conditions are set to indicate that the slope under inspection is exhibiting unsafe movement.

21 Claims, 6 Drawing Sheets

OTHER PUBLICATIONS

Kane et al.; "Instrumentation Practice for Slope Monitoring"; Preprint, 2000; <retrieved at http://www.kanegeotech.com/publications/html on Aug. 23, 2006> See for example the abstract.

Engineer manual EM 1110-2-2300. "General Design and Construction Considerations for Earth and Rock-fill Dams"; US Army Corps of Engineers, Jul. 30, 2001, <retrieved at http://www.usace.army.mil/publications/eng-manuals/em1110-2-2300 on Aug. 23, 2006> See for example Appendix C, E-3 and Fig. E-4.

McHugh; "Video Motion Detection for Real-Time Hazard Warnings in Surface Mines"; SME Annual Meeting, Denver, Colorado, Feb. 23-25, 2004; <retrieved at http://www.cdc.gov/niosh/mining/pubs/pdfs/vmdfr.pdf on Aug. 23, 2006> See for example the abstract.

* cited by examiner

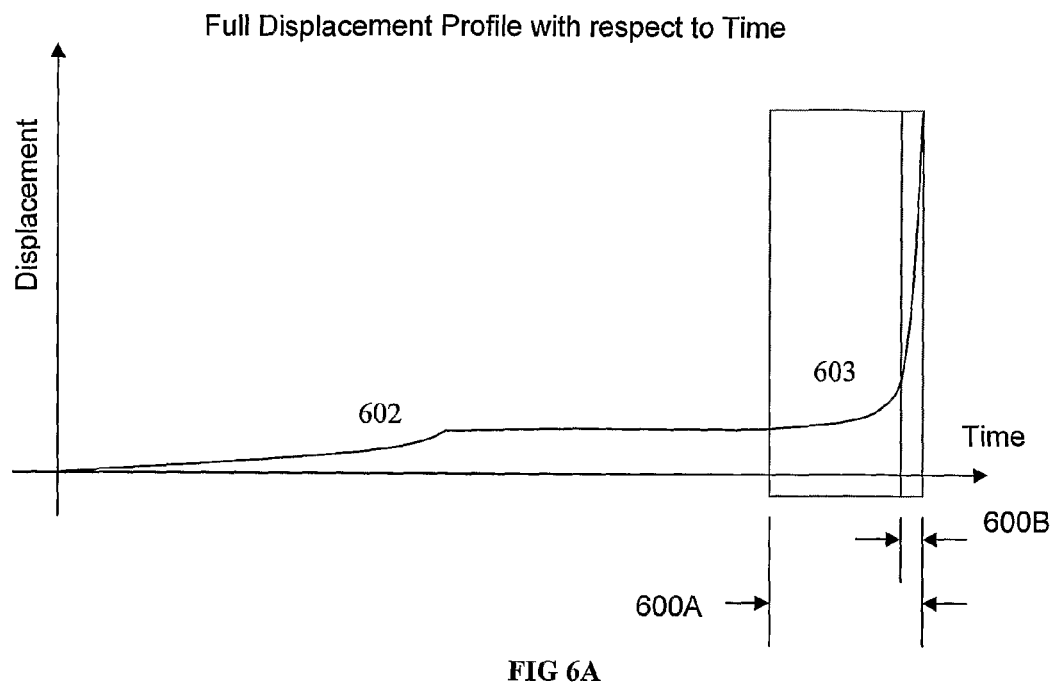
FIG 6A
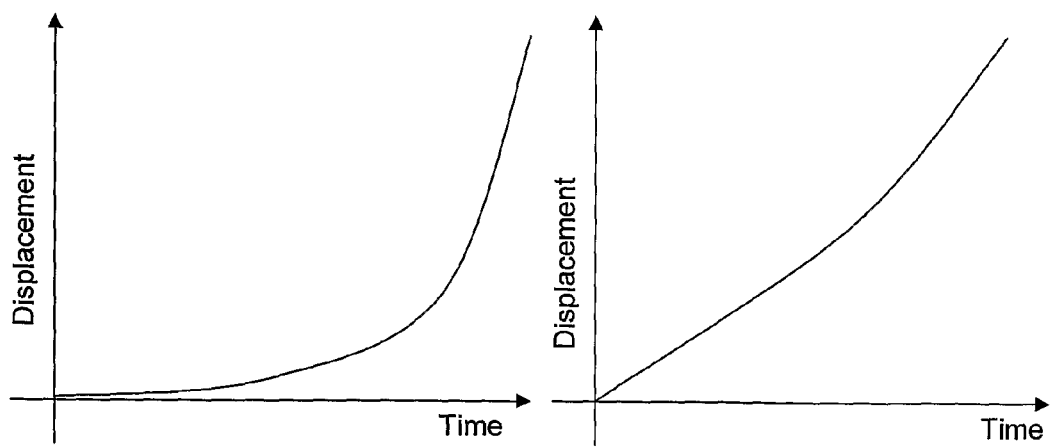
FIG 6B
FIG 6C

METHOD AND SYSTEM OF DETERMINING ALARM CONDITIONS

FIELD OF THE INVENTION

The invention relates to a method and system of determining alarm conditions. In particular, although not exclusively, the invention relates to a method and system of determining alarm conditions in the field of slope stability monitoring.

BACKGROUND TO THE INVENTION

Slope stability is a critical safety and production issue for open cut mines, quarries, civil engineering works and the like. Major wall failures can occur seemingly without warning causing loss of lives, damage to equipment and significant disruption to the mining process resulting in significant losses in productivity.

Tell-tale signs of slope instability include the opening of cracks on the wall surface and crest, audible cracking, seismicity, changes in groundwater flow and increased rilling of spoil. It is difficult to interpret these signs to be able to distinguish between expected deformation of recently excavated ground and events that will lead to catastrophic slope failure.

There are various slope monitoring systems employed by mine sites to monitor movement of slopes in order to provide an accurate reflection of the movement characteristics of the monitored slope. Such systems include the use of extensometers and laser electronic distance measurement to measure the deformation of the excavation surface and dilation of cracks appearing on the crest or face of the slope. Geotechnical specialist can then interpret the pattern and history of movement to improve prediction of the failure process and to advise appropriate and timely stabilisation or safety management actions.

The Applicants have previously provided a novel slope monitoring system published under International Publication number WO 02/46790. This system utilises radar and visual data to monitor an area of the slopes face to determine movement of discrete sections of the wall. In this system, various alarm conditions have been proposed involving processing the area or magnitude of movement of a slope or any of it's time derivatives and comparing these values with predefined displacement values in order to trigger an alarm.

Almost all slopes exhibit a range of movement types prior to failure. These movement types include (T. D. Sullivan, "Understanding pit slope movements", Geotechnical Instrumentation and Monitoring in Open Pit and Underground Mining p 435-445, 1993):

1) regressive movements leading to stability,
2) progressive movements leading to collapse,
3) transitional movements which combine the regressive movements followed by progressive, and
4) stick slip which is a number of regressive/transgressive movements normally induced by an external influence such as rainfall, blasting or mining.

Not all of these movements constitute a warning of "operational" failure. For example regressive or linear movements in a wall indicate that the wall is moving towards stability. For this case, the mine will often work under such a slope, due to a low risk of failure (apart from a manageable risk of smaller rocks being dislodged from the wall). In contrast, progressive movements are indicators of failure. However, even in these more dangerous situations mine personnel can operate safely under the slope in the initial stages of movement. Finally, stick slip requires a very interactive mining process, where mining continues until new movements occur (often this is due to the mining), after which the mine waits until the slope restabilises.

All absolute movement measures (displacement, velocity, acceleration and other time-derivatives) of a wall depends on many factors including the displacement type, the size of the moving area, the material type, the planes of weakness in the wall, complexity of the sliding plains, the temporal history of movements, and external influences on the system. Even the look angle of the monitoring apparatus influences the apparent current velocity of the movement. For example, if the look angle is 60 degrees from the wall movement velocity vector, the measured velocity will be half the actual velocity of the wall. In short, simply using an absolute movement measure to trigger alarms gives limited indication of the risk of failure associated with the slope under consideration.

An example of the risk can be demonstrated by a case where there is a large constant velocity movement in a first area of the slope, in conjunction with a smaller accelerating movement in a second area of the slope. An alarm is applied over the entire region at 1.5 times the current movement in the large region. Even though the movements in the second area may be smaller, because they are accelerating, that region of the wall is likely to be more dangerous.

A failure could easily occur in this second area with the release of rocks from the wall. All this could occur without the movement in the second area ever reaching the larger constant velocity movements in the first area, thus the alarm of a monitoring apparatus would not sound. Generally, this situation can be avoided by relying upon the experience of geotechnical personnel that have a level of knowledge of the ground conditions of the slope under inspection and the use of multiple alarms. However, it remains a difficult situation, with a high chance that the smaller movements are missed.

More reliable measures of wall stability have been suggested, specifically for the post analysis of slope failures. One of the most common methods is to try to estimate the time to failure. There are a number of methods to estimate this, with Cruden et al. (D. M. Cruden and S. Masoumzadeh, "Accelerating Creep of the Slopes of a Coal Mine", Rock Mechanics and Rock Engineering 20, pp 123-135, 1987) providing a good description of each of the various methods. The methods include Saito law, exponential laws, power laws, Zavodni and Broadbent laws.

Ryan et al. (T. M. Ryan and R. D. Call, "Applications of Rock Mass Monitoring for Stability Assessment of Pit Slope Failure", Rock Mechanics, 221-228, 1992) also investigated these various accelerating displacement models. The conclusion reached by Ryan, et. al. was that velocity measures did have some indication of time to failure, however, a more definitive estimate was the ratio of the velocity a day before to the velocity two days before. The described techniques however rely on user input to determine when the slope has started to move in a progressive manner. This method also does not account for more rapid wall movements where the time to failure is less than a week. Hence, the method contemplated is inadequate as slope failures are often rapid occurrences that can occur in a matter of hours from the first critical motion.

Thus, whilst prior art slope monitoring apparatus offer varying levels of monitoring accuracy, it is desirable to provide a slope monitoring apparatus that can automatically and accurately determine alarm conditions based on the recorded displacement data of the slope under inspection, thus providing a warning of a change in risk associated with the stability of a slope.

OBJECT OF THE INVENTION

It is an object of the invention to overcome or at least alleviate one or more of the above problems and/or provide the consumer with a useful or commercial choice.

DISCLOSURE OF THE INVENTION

In one form, although it need not be the only or indeed the broadest form, the invention resides in a method of determining alarm conditions of a slope under inspection, said method including the steps of:

(i) calculating one or more dimensionless threat estimate values for each of one or more time periods;

(ii) selecting a maximum dimensionless threat estimate value from the one or more said dimensionless threat estimate values calculated in (i);

(iii) comparing the maximum dimensionless threat estimate value with a threshold alarm value; and (iv) setting alarm conditions if the maximum dimensionless threat estimate value exceeds the threshold alarm value.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein:

FIG. 6A shows a graph of displacement of a slope under inspection with respect to time;

FIG. 6B shows a graph of displacement of the slope under inspection in FIG. 6A over a first time period; and FIG. 6C shows a graph of displacement of the slope under inspection in FIG. 6A over a second time period.

DETAILED DESCRIPTION OF THE INVENTION

The system and method of determining alarm conditions according to the present invention provides a threat estimate calculated from recorded displacement data of the slope with respect to time to alert personnel of a possible slope failure occurrence. The threat estimate provided by the method and system of the present invention is slope independent in that it allows failure alarms to be initiated without the requirement for geotechnical personnel to set slope specific threshold values of displacement with respect to time for a particular slope. In addition, the threat estimate is independent of viewing angle to the wall, and also is independent of the direction of the wall movement.

Figure 1:
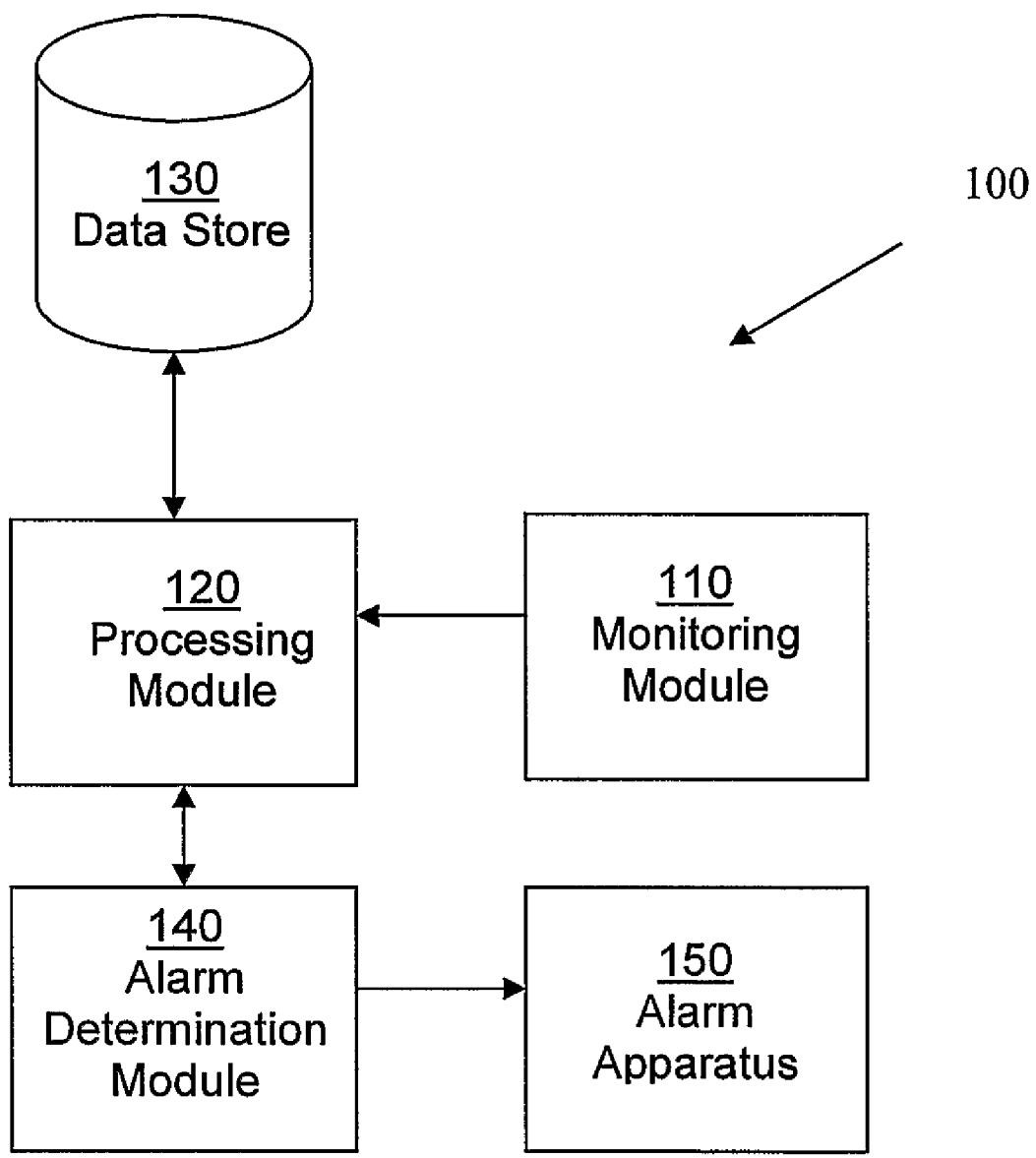
FIG. 1 shows a block schematic of a slope monitoring system according to an embodiment of the present invention.

FIG. 1 shows a block schematic of a slope monitoring system 100 according to an embodiment of the present invention. Slope monitoring system 100 comprises a monitoring module 110 in communication with a processing module 120 and a data store 130 in communication with processing module 120. Slope monitoring system further comprises an alarm determination module 140 in communication with processing module 120 and an alarm apparatus 150 in communication with alarm determination module 140.

Monitoring module 110 is in the form of any known slope monitoring apparatus able to detect movement in a wall of a slope. Preferably, monitoring module 110 is in the form of a radar module in conjunction with a visual module in order to detect movement of a slope wall under inspection. Optionally, monitoring module 110 may be in the form of a plurality of extensometers, laser electronic distance measurement apparatus or the like.

Processing module 120 is in communication with monitoring module 110 and receives raw slope position data detected by monitoring module 110. Processing module 120 interprets the raw data received by monitoring module 110 and translates this raw data to displacement data for the slope under inspection. Preferably, processing module 120 is in the form of software operating on hardware in order to perform the function discussed briefly above. A skilled person will readily identify that processing module 120 may be in the form of software operating on a standard personal computing device or, optionally, be proprietary hardware arranged to perform this function.

Data store 130 is in the form of a database as is known in the art and is able to have data logically stored thereto and retrieved therefrom. Preferably, database 130 is implemented via software executing on appropriate hardware.

Alarm determination module 140 is in communication with processing module 120 and is preferably in the form of a software module executing on appropriate hardware. Additionally, alarm determination module 140 is in operative communication with data store 130 and utilizes the method of the present invention in order to determine whether alarm conditions exist in relation to the stability of the slope under inspection as will be discussed in greater detail below.

It will be readily apparent to a skilled person that processing module 120, data store 130 and alarm determination module 140 may be implemented on a standard personal computing device. Optionally, each of processing module 120, data store 130 and alarm determination module 140 may be located on geographically separate computing devices with communication between each module facilitated by means of known distributed computing paradigms. Furthermore, it will be appreciated that processing module 120 and alarm determination module 140 may form part of single software platform with the modules 120 and 140 being logical separations of the functional attributes of the same program.

The method of determining alarm conditions according to the present invention involves analysis of displacement data for the slope face under inspection with respect to time to provide a dimensionless threat estimate.

Figure 2:
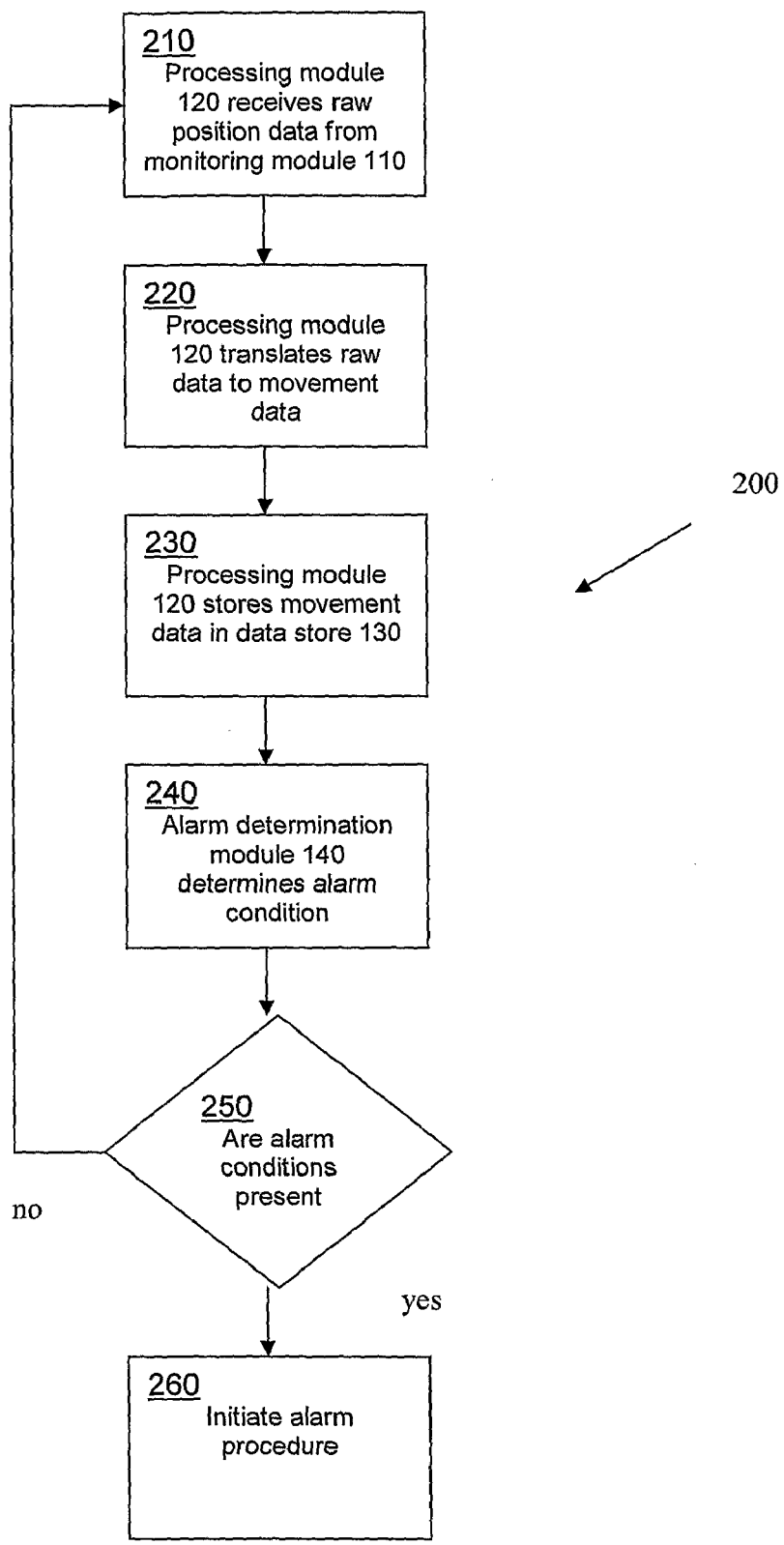
FIG. 2 shows a slope monitoring method according to an aspect of the present invention.

FIG. 2 shows a method 200 of slope monitoring according to an aspect of the present invention. The method commences with the processing module 120 receiving raw position data from monitoring module 110 in relation to the slope under inspection (step 210). Processing module 120 translates this raw position data to displacement data per unit time in respect of the slope under inspection (step 220) and stores this information in data store 130 (step 230).

Alarm determination module 140 then communicates with data store 130 in order to determine whether, based on the displacement data per unit time stored in data store 130 by processing module 120, alarm conditions exist (step 240). Step 240 will be discussed in greater detail below. If alarm conditions exist (step 250) then alarm determination module 140 initiates alarm procedure (step 260). Preferably, step 260 involves actuating a combination of one or more alarm mechanisms in alarm apparatus 150.

For example, alarm apparatus 150 may initiate a combination of aural, visual or tactile alarm signals in order to alert personnel of a slope instability event. Optionally, alarm apparatus 150 includes a communication module able to transmit an alert message to one or more relevant entities in order to alert these entities of the slope instability event.

If alarm conditions do not exist (step 250), then processing module again receives raw observation data from monitoring module 110 (step 210).

It will be appreciated that steps 210-230 may run in parallel with step 260 when alarm conditions are identified in step 240. As such, the slope monitoring system 100 of the present invention continues to monitor the slope under inspection during a possible slope failure event.

Furthermore, step 240 may optionally be initiated at timed intervals and not execute each time raw position data is observed by monitoring module 110.

Figure 3:
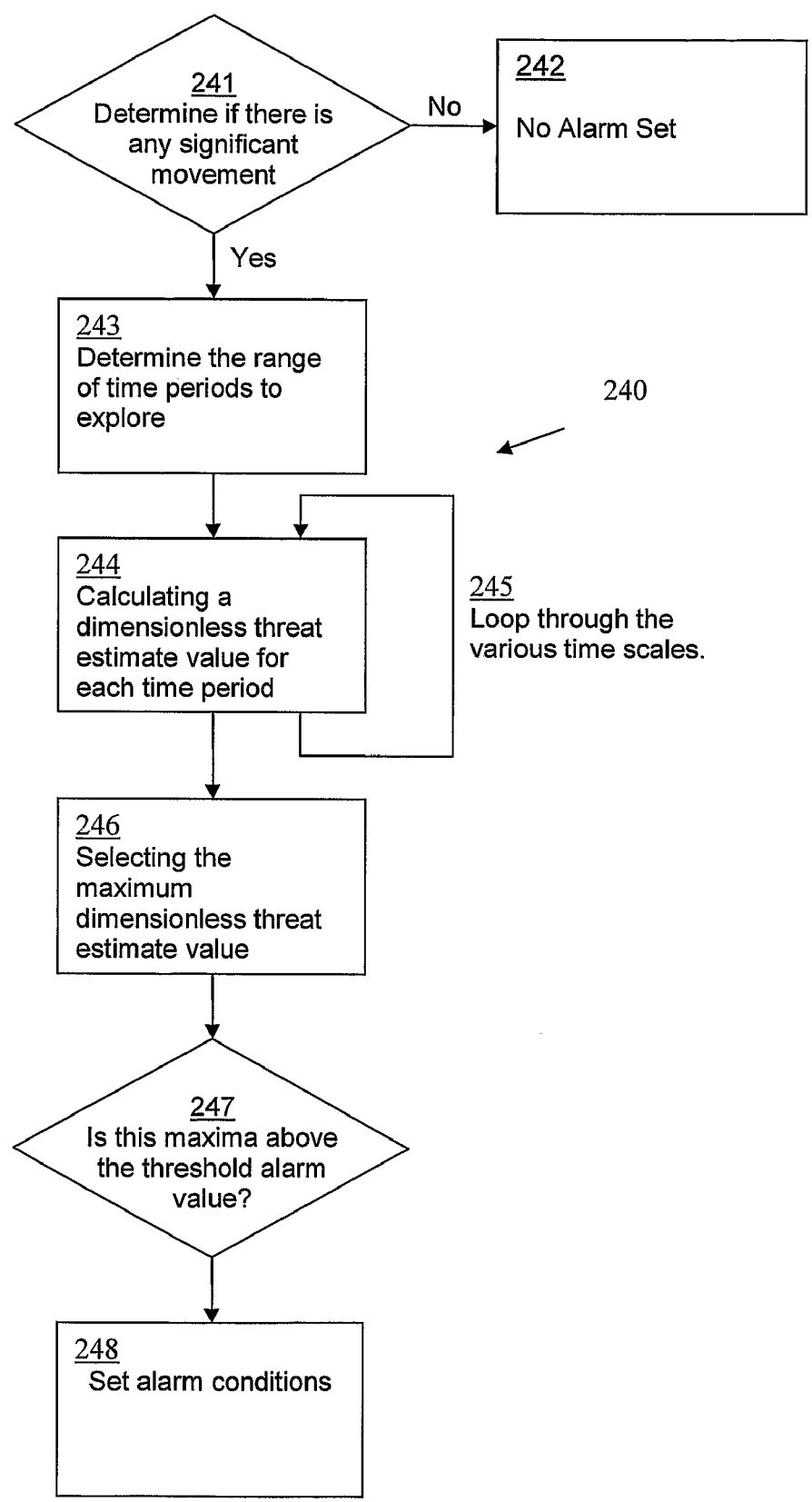
FIG. 3 shows a method of determining alarm conditions forming part of the method shown in FIG. 2.

FIG. 3 shows the method of determining alarm conditions shown in step 240 in FIG. 2 in greater detail. Step 240 is described in the context of calculating a dimensionless threat estimate based on taking velocity data at the beginning and end of a time period and providing a ratio of these values. It will be appreciated that the current invention may be applied to calculating dimensionless threat estimates based on any time derivative of the displacement data calculated in step 220.

Furthermore, it will be appreciated that, as this ratio is calculated from a ratio of time derivatives of movement data, it is in effect calculating the level of curvature of a graph of the time derivative of movement data against time. As such, the fitting of an exponential curve to this data may also be used to calculate this dimensionless threat estimate value.

In step 241, the significance of the movement in the slope over a time period is determined. For example, if the movement at the start of the time period is zero and there has been movement at the end of the time period, the ratio of these values taken will approach infinity. Furthermore, there is a limited amount of noise in any slope monitoring system. As such, in situations where there is no actual movement of the wall, this noise value may unrealistically affect the dimensionless threat estimate.

As such, in step 241, the alarm determination module 140 compares the velocity reading at the end of the time scale against a predefined user velocity threshold. For example, the user threshold may be set at just above the total system errors of the monitoring apparatus. If the velocity at the end of the time period is below the predefined user velocity threshold, no alarm is set (step 242 and method 200 continues to loop.

If the velocity at the end of the time period is above the predefined user threshold, method 240 continues. In step 243, the alarm determination module 140 calculates the time period over which the dimensionless threat estimate is calculated. This time period may be preset to use the initial velocity calculation at start up of the slope monitoring system 100 and the most recent velocity estimate to calculate the dimensionless threat assessment value. Optionally, the time period over which the threat estimate value is calculated may be an arbitrary time period set by the user such as an hour, a day, or any other user definable time period.

Preferably, alarm determination module 140 calculates a series of one or more time periods over which separate dimensionless threat estimate values will be calculated. Suitably, each time period has the same end time, that is the current time at which the assessment is being made, and different start times. For example, two time periods may be used by alarm determination module, the first time period selected having a start time 2 hours prior to the current time, and the second time period selected having a start time 6 hours prior to the current time.

Hence, in step 243, the alarm determination module 140 determines one or more time periods with a separate dimensionless threat estimate value to be calculated for each time period.

A dimensionless threat estimate value is then calculated over each of the time periods (step 244) determined in step 243. The maximum dimensionless threat estimate is then identified (step 246) from the one or more dimensionless threat estimate values calculated in step 244.

This selected maximum dimensionless threat estimate value is then compared against a user defined threat threshold value (step 247) and, if the maximum dimensionless threat estimate value exceeds the user defined threshold value, then alarm conditions are set (step 248) and method 200 continues as previously described.

The method of determining alarm conditions of the present invention does not necessarily provide for an estimate as to the time to failure of a slope under inspection nor indeed provide an indication that a slope under inspection will necessarily fail. Rather, the method of the present invention provides an indication as to the change in dynamics of a slope under inspection in order that technical personnel can assess the risk associated with the change in dynamics in order to determine whether it is safe for operations to continue.

Figure 4A:
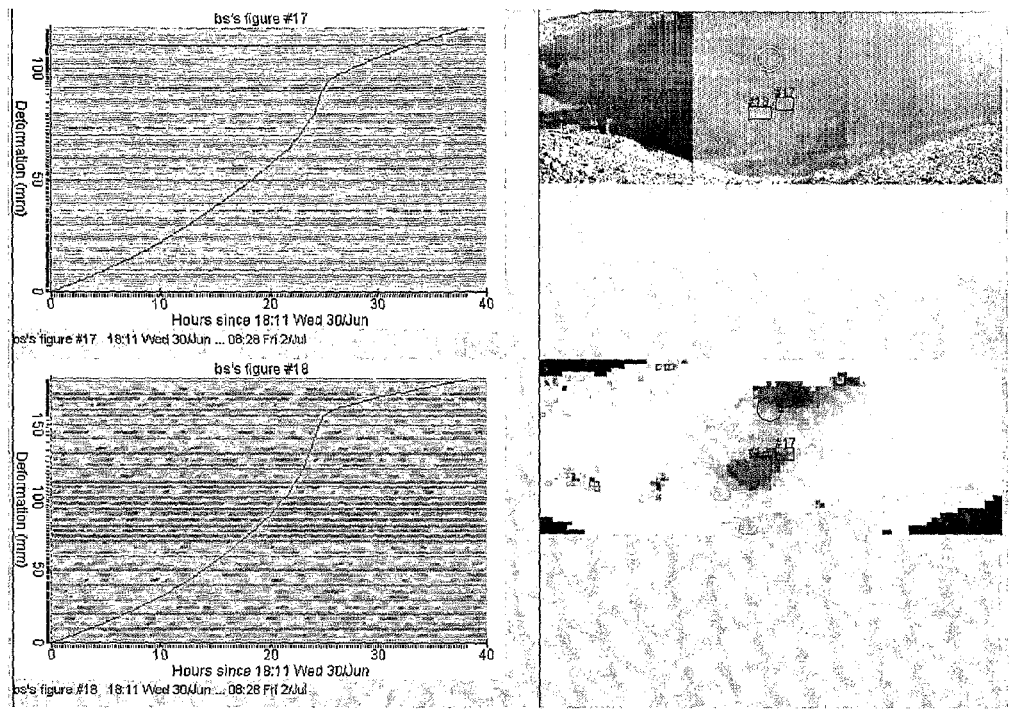
FIG. 4A shows a graph of displacement of a slope under inspection with respect to time.

FIG. 4A shows a graph of displacement with respect to time of a slope under inspection. The displacement curves shown represent deformation up to and after a slope failure event. As seen, the total deformation was around 100-170 mm at various regions of the wall.

Figure 4B:
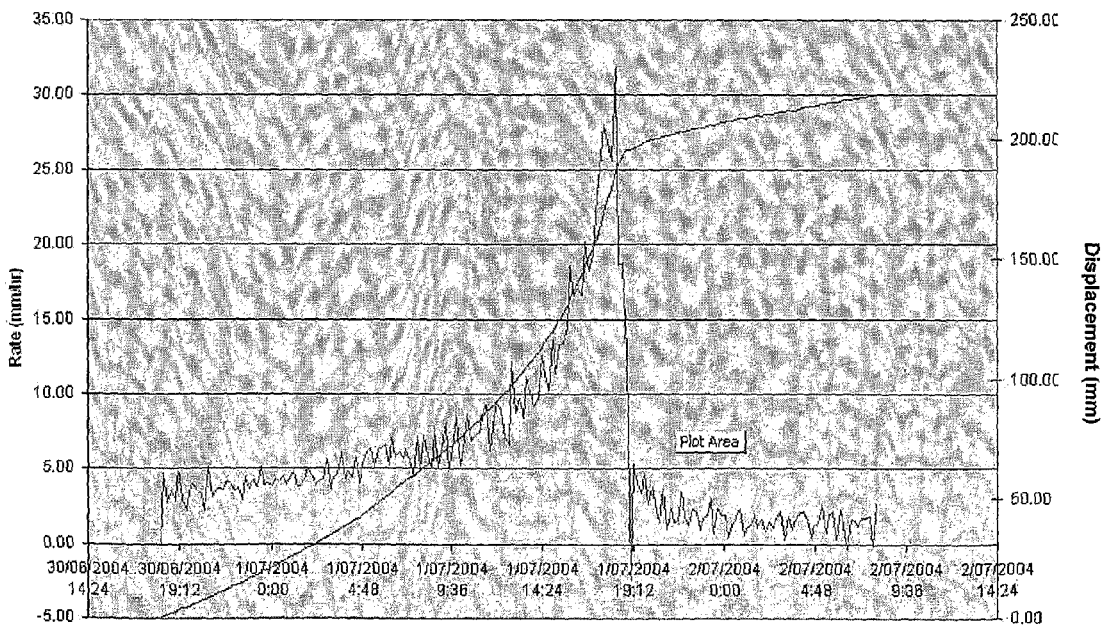
FIG. 4B shows the graph of displacement of a slope under inspection shown in FIG. 4A along with in conjunction with a plot of the instantaneous velocity estimate of the slope.

FIG. 4B shows a plot of the instantaneous velocity (or rate in mm/hr), with respect to time, in conjunction with a displacement curve for a section of a face of the slope under inspection. It is clear from the graph that over the 24 hours prior to failure, the velocity of the section of the slope under inspection increased by more than 7 times from 4 mm/hour to 30 mm/hour.

Utilizing the method of the present invention at a time 4 hours before the event and using a threat threshold value of 2 and a time scale of 2 hours, the dimensionless threat estimate value calculated at step 244 is approximately 2.75 and using a time period of 12 hours, the dimensionless threat estimate value calculated at step 244 is approximately 2.2. Hence, the dimensionless threat estimate value of 2.75 would be selected at step 246 which is in excess of the threshold value of 2 and hence alarm conditions would be set in step 248.

Figure 5A:
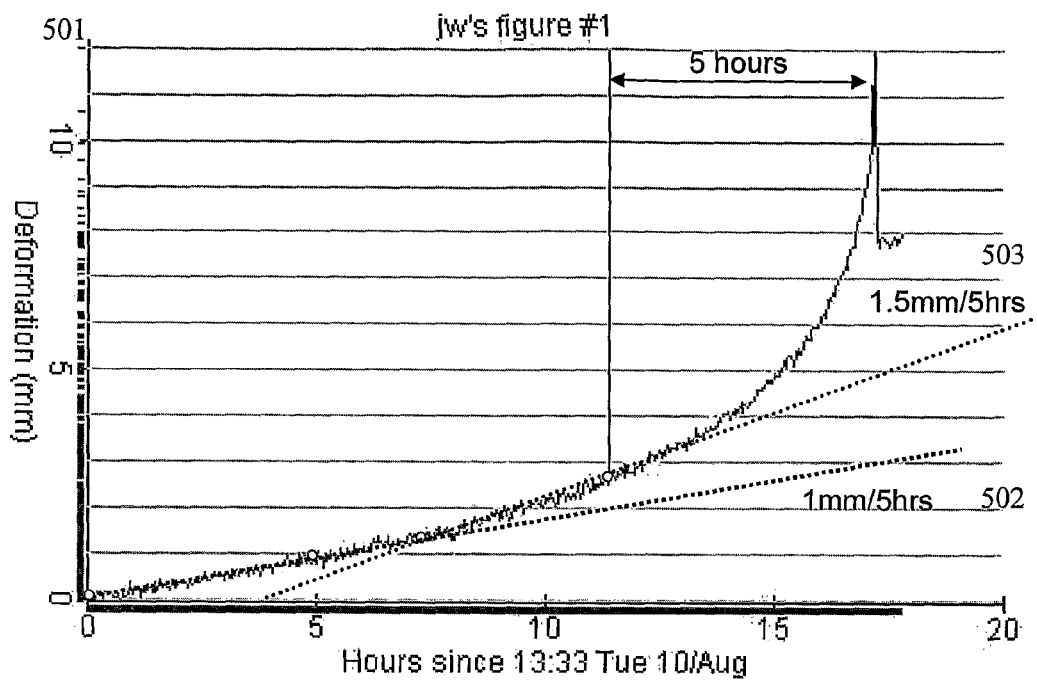
FIG. 5A shows a graph of displacement of a slope with respect to time demonstrating the typical acceleration curves prior to failure.
Figure 5B:
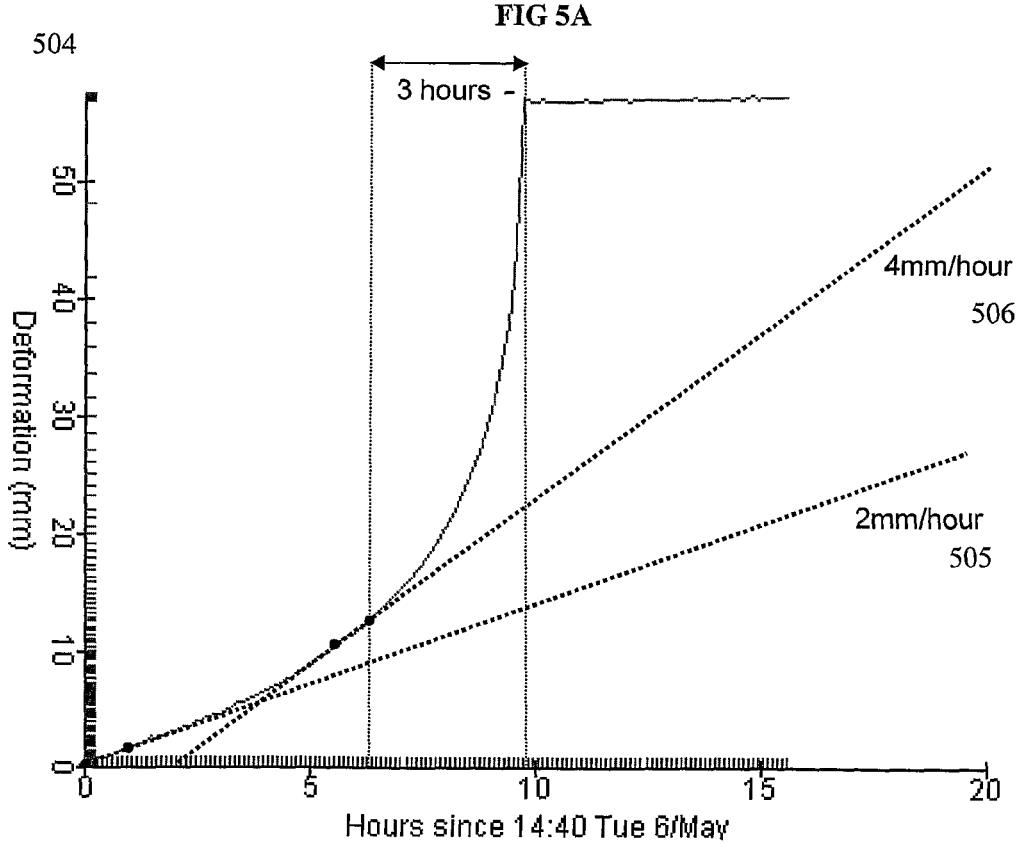
FIG. 5B shows a further graph of displacement of a slope with respect to time demonstrating the typical acceleration curves prior to failure.

FIG. 5A and FIG. 5B show further graphs which demonstrate the velocity ratio method of calculating a dimensionless threat estimate value for various curves. All these curves clearly indicate significant movements, and have been displayed at an appropriate time period to appreciate the displacement curve. For each of these curves, a dimensionless threat estimate value of 1.5 would provide at least three hours warning of the failure.

As a result, if a velocity ratio is used to determine the dimensionless threat estimate value, then typical dimensionless threshold values are set in the range between 1.5 and 2.5. A value of 1.5 indicates that the velocity has increased by more than 50% over the given period of time, and value of 2.5 indicates a 150% increase. For values lower than this there is likely to be a high chance of false alarm.

FIGS. 6A-6C demonstrate the time dependence of determining the dimensionless threat estimate value. For each failure, the rate of progression of displacements to failure is different. This depends on a number of factors, ranging from the fracture planes and amount of material to external influences on the wall. As result, if dimensionless threat estimates are calculated at a set time period, the wall movements may not appear to be a threat, due to either the time period being too short or too long. The result is a possible misdiagnosis of an unstable wall.

FIG. 6A shows the full displacement profile for a typical failure. Earlier slips have occurred in the slope, indicated by reference numeral 602, prior to the final precursors to failure, indicated by reference numeral 603. This complicates the alarm determination algorithm, thus it is desirable to only make the assessment over a shorter period of time. For this example, two time periods, 600A and 600B, are selected in step 243 in order to calculate the dimensionless threat estimate.

FIG. 6B shows the displacement graph for time period 600A. For this time period, a clear acceleration curve can be seen, with the final velocity 4 to 5 times greater than the initial velocity and hence the method of the present invention produces a dimensionless threat assessment value of 4 to 5 in step 244.

In contrast FIG. 6C shows a graph for time period 600B. At this time period, the wall appears to be moving at a constant velocity and hence the dimensionless threat estimate value calculated in step 244 is approximately 1. Hence, in step 246, the dimensionless threat estimate value calculated for time period 600A would be selected and compared against the threshold value to determine whether alarm conditions should be set.

The above example highlights that whilst the method of the present invention may be employed successfully using a single time period, in a preferred form, a series of time periods are selected in step 243, however always keeping the final time within the time period as the current time or the time of the last slope movement measurement. Dimensionless threat estimate values are calculated for each of the time periods and the maximum dimensionless threat estimate value is compared against the threshold value to determine whether alarm conditions should be set.

An extension of this invention is to use the dimensionless threat estimate as the value in a 2D spatial image of wall movements. It is known in the prior art to use displacement or any of it's time derivatives in the 2D spatial image (e.g. FIG. 4A) to indicate movement of a slope under inspection, but this causes problems with the color palette sensitivity when different parts of the wall are moving by differing amounts and differing rates. For example, a large area of a wall could have moved 1000 mm with a constant velocity, but a small area of the wall could have moved 10 mm with sharp acceleration. If the color palette maximum of the 2D spatial image is set high, the small area movement would not be displayed. If the color palette maximum of the 2D spatial image is set low, any change of movement in the large area from constant velocity to acceleration would be missed. However, a 2D spatial image using the dimensionless threat estimate of the present invention would display movement characteristics of both wall areas and color-code the wall area with greatest threat (e.g. largest dimensionless threat estimate) of rock fall. Another advantage of the threat estimate image is its independence to viewing angle to the wall, and also it's independence to the direction of the wall movement as errors cancel when the ratio is taken.

The method and system of the present invention provides a dimensionless threat estimate that can be used to alert relevant parties to the likelihood of a slope instability event whereby alarm conditions are not associated with exceeding thresholds based on displacement or any of it's time derivatives. As such, the method and system of the present invention is able to more accurately identify unsafe slope movements with a method that is independent of geometry and less dependent of the specific characteristics of the slope wall under inspection.

Throughout the specification the aim has been to describe the invention without limiting the invention to any one embodiment or specific collection of features. Persons skilled in the relevant art may realize variations from the specific embodiments that will nonetheless fall within the scope of the invention.

It will be appreciated that various other changes and modifications may be made to the embodiment described without departing from the spirit and scope of the invention.

The invention claimed is:

1. A method of determining alarm conditions of a slope under inspection, the method including the steps of:
   (i) calculating one or more ratios for each of one or more time periods, each of the one or more ratios being calculated based on movement data in respect of at least a portion of the slope under inspection;
   (ii) selecting a maximum ratio from the one or more said ratios calculated in (i);
   (iii) comparing the maximum ratio with a threshold alarm value; and
   (iv) setting alarm conditions if the maximum ratio exceeds the threshold alarm value.

2. The method of claim 1, wherein each said time period has a start time and an end time, the end time of each time period being the same point in time and the start time of each time period being a different point in time.

3. The method of claim 1, wherein each said ratio is calculated by taking a ratio of velocity data of the slope under consideration at an end time of a respective time period with velocity data of the slope under consideration at a start time of said respective time period.

4. The method of claim 1, wherein each said ratio is calculated by taking a ratio of a time derivative of displacement data recorded for the slope under consideration at an end time of a respective time period with a time derivative of displacement data recorded for the slope under consideration at a start time of the respective time period.

5. The method of claim 1, wherein each said ratio is calculated by fitting an exponential curve to a graph of a time derivative of movement data of the slope under inspection against time.

6. The method of claim 1, wherein a ratio is calculated for each of at least two time periods to provide at least two said ratios.

7. The method of claim 6, wherein the significant velocity is predetermined by a user.

8. The method of claim 1 further including the step of determining whether velocity data of the slope under consideration at an end time of a time period is greater than a significant velocity prior to calculating a ratio for that time period.

9. The method of claim 1 further including the step of initiating one or more alarm procedures if alarm conditions are set in step (iv).

10. The method of claim 9, wherein the alarm procedures involves initiating a combination of one or more of aural, visual or tactile alarm signals.

11. The method of claim 9, wherein the alarm procedures involves communicating an alarm message to a relevant entity.

12. A system of determining alarm conditions of a slope under inspection, the system comprising:
    a monitoring module for detecting movement in at least a portion of the slope under inspection;
    a data store in operative communication with the monitoring module for storing processed movement data in respect of the detected movement of the slope under inspection;
    an alarm determination module in operative communication with the data store, the alarm determination module configured to calculate one or more ratios based on the processed movement data stored in the data store and setting alarm conditions if at least one of the calculated ratios exceeds a threshold alarm value.

13. The system of claim 12 further comprising an alarm apparatus in communication with the alarm determination module, the alarm apparatus being actuated if alarm conditions are set by the alarm determination module.

14. The system of claim 13, wherein the alarm apparatus initiates a of one or more of aural, visual or tactile signals if alarm conditions are set by the alarm determination module.

15. The system of claim 13, wherein the alarm apparatus includes a communication module to communicate an alert message to a relevant entity if alarm conditions are set by the alarm determination module.

16. The system of claim 12, wherein the monitoring module is in the form of a radar module to detect movement in at least a portion of the slope under inspection.

17. The system of claim 12, wherein the alarm communication module calculates at least two ratios, each ratio being calculated over a time period having the same end time and different start times.

18. A slope monitoring system comprising:
    a monitoring module in the form of a radar module that records radar data in respect of a slope under inspection;
    a processing module that receives the radar data and carries out interferometric processing on the radar data to provide processed movement data in respect of the slope under inspection;
    a data store for receiving and storing the processed movement data an alarm determination module in operative communication with the data store, the alarm determination module configured to calculate one or more ratios based on the processed movement data stored in the data store and setting alarm conditions if at least one of the calculated ratios exceeds a threshold alarm value.

19. The slope monitoring system of claim 18, wherein the processing module is further configured to produce interference maps from the radar data, the interference maps indicative of movement of the slope under consideration.

20. The slope monitoring system of claim 18 further comprising a visual module for recording at least one visual image of the slope under consideration.

21. The slope monitoring system of claim 20, wherein the processing module is further configured to produce interference maps from the radar data, the interference maps indicative of movement of the slope under consideration, the processing module configured to perform coordinate registration to align said interference maps and said at least one visual image.

* * * * *

UNITED STATES PATENT AND TRADEMARK OFFICE
CERTIFICATE OF CORRECTION

| | | |
|---|---|---|
| PATENT NO. | : 7,855,640 B2 | Page 1 of 1 |
| APPLICATION NO. | : 11/988820 | |
| DATED | : December 21, 2010 | |
| INVENTOR(S) | : Reeves et al. | |

It is certified that error appears in the above-identified patent and that said Letters Patent is hereby corrected as shown below:

Claim 14 at Column 9, Line 32:

Delete "a of" and replace with -- a combination of --.

Signed and Sealed this
Fifteenth Day of February, 2011

David J. Kappos
*Director of the United States Patent and Trademark Office*